United States Patent [19]

Leach

[11] Patent Number: 4,708,969
[45] Date of Patent: Nov. 24, 1987

[54] CYCLOOLEFIN COMPOSITION AND METHOD FOR MAKING HIGH TG FIBER REINFORCED POLYMERIC PRODUCT

[75] Inventor: Douglas R. Leach, Newark, Del.

[73] Assignee: Hercules Incorporated, Wilmington, Del.

[21] Appl. No.: 874,191

[22] Filed: Jun. 13, 1986

Related U.S. Application Data

[63] Continuation-in-part of Ser. No. 672,390, Nov. 16, 1984, Pat. No. 4,598,102, which is a continuation-in-part of Ser. No. 623,307, Jun. 21, 1984, Pat. No. 4,496,669, which is a continuation of Ser. No. 552,872, Nov. 17, 1983, Pat. No. 4,458,037.

[51] Int. Cl.$^4$ .............................. C08G 18/14
[52] U.S. Cl. .................... 521/82; 252/182; 264/51; 264/328.1; 264/328.2; 264/328.6; 521/93; 521/95; 521/99; 521/122; 521/123; 521/124; 521/139; 521/140; 524/228; 524/424; 524/553; 524/554; 525/211; 525/289; 526/135; 526/169; 526/281; 526/283
[58] Field of Search .................. 521/93, 95, 124, 139, 521/140, 150, 92, 91, 123, 82, 99, 122; 252/182; 524/228, 424, 553, 554, 714, 786; 526/135, 169, 281, 283; 264/51, 328.1, 328.2, 328.6; 525/211, 289

[56] References Cited

U.S. PATENT DOCUMENTS

| | | | |
|---|---|---|---|
| 3,084,147 | 4/1963 | Wilks | 260/93.1 |
| 3,446,785 | 5/1969 | Stafford | 260/93.1 |
| 3,557,072 | 1/1971 | Vergne et al. | 260/88.2 |
| 3,627,739 | 12/1971 | Devlin | 260/88.2 |
| 3,684,787 | 8/1972 | Nutzel | 260/93.1 |
| 3,873,644 | 2/1975 | Pampus et al. | 260/879 |
| 3,935,179 | 1/1976 | Ofstead | 260/93.1 |
| 3,974,092 | 8/1976 | Streck et al. | 252/429 |
| 3,974,094 | 8/1976 | Streck et al. | 252/429 |
| 4,002,815 | 1/1977 | Minchak | 526/283 |
| 4,020,254 | 4/1977 | Ofstead | 526/128 |
| 4,136,247 | 1/1979 | Tenney et al. | 526/283 |
| 4,136,248 | 1/1979 | Tenney | 526/283 |
| 4,136,249 | 1/1979 | Tenney et al. | 526/283 |
| 4,178,424 | 12/1979 | Tenney et al. | 526/283 |
| 4,250,063 | 2/1981 | Kotani et al. | 260/252 |
| 4,380,617 | 4/1983 | Minchak et al. | 526/161 |
| 4,400,340 | 8/1983 | Klosiewicz | 264/328.6 |
| 4,418,179 | 11/1983 | DeWitt et al. | 525/249 |
| 4,426,502 | 1/1984 | Minchak | 526/172 |
| 4,436,858 | 3/1984 | Klosiewicz | 524/296 |
| 4,458,037 | 7/1984 | Leach | 521/124 |
| 4,469,809 | 9/1984 | Klosiewicz | 502/117 |
| 4,481,344 | 11/1984 | Newburg | 526/143 |
| 4,485,208 | 11/1984 | Klosiewicz | 524/297 |

FOREIGN PATENT DOCUMENTS

92000 3/1978 Japan.
111399 11/1978 Japan.

OTHER PUBLICATIONS

Takata, et al., J. Chem. Soc., Japan, Ind. Chem. Sect., 69,711 (1966).
G. Dall Asta, et al., Die Makromokekulure Chemie 130, 153 (1969).
Takao Oshika, et al., Bulletin of the Chemical Society of Japan 41, 211–217 (1968).
Billmeyer, Textbook of Polymer Science 1962, p. 52.
Treloar, The Physics of Rubber Elasticity 1975, pp. 142–145.

*Primary Examiner*—Maurice J. Welsh
*Attorney, Agent, or Firm*—Dale R. Lovercheck

[57] ABSTRACT

A composition and method for polymerization of cycloolefins using a feed stream including an iodide containing activator to form a substantially cross-linked polymeric product. The polymeric product may be formed by polymerization in an intricately shaped mold and/or be of ultra-low density. High glass transition temperature and fiber reinforced products are formed.

42 Claims, No Drawings

CYCLOOLEFIN COMPOSITION AND METHOD FOR MAKING HIGH TG FIBER REINFORCED POLYMERIC PRODUCT

This is a continuation-in-part of earlier filed U.S. patent application Ser. No. 672,390 filed Nov. 16, 1984 now U.S. Pat. No. 4,598,102, which is a continuation-in-part of U.S. Ser. No. 623,307 filed June 21, 1984, now U.S. Pat. No. 4,496,669, which is a continuation of U.S. Ser. No. 552,872 filed Nov. 17, 1983, now U.S. Pat. 4,458,037.

BACKGROUND OF THE INVENTION

This invention relates to a novel polymer product and feed composition. In particular, it relates to a high modulus, cross-linked, thermoset polymer of polymerized units of cycloolefin which is formed using an iodine containing activator. Preferably the product is fiber reinforced and has a high glass transition temperature.

A thermoset homopolymer having high impact strength and high modulus has been described by Tom in U.S. Pat. No. 4,507,453 and Klosiewicz in U.S. Pat. Nos. 4,568,660, 4,400,340, 4,469,809 and 4,436,858 (with plasticizer) and by Leach in U.S. Pat. No. 4,458,037 (a foam). Characteristics of thermoset polymers include insolubility in common solvents such as gasoline, naphtha, chlorinated hydrocarbons, and aromatics as well as resistance to flow at elevated temperatures.

U.S. Pat. No. 4,002,815, teaches the copolymerization of cyclopentene with dicyclopentadiene and describes an insoluble by-product and suggests that the by-product could be a gel of a dicyclopentadiene homopolymer.

BRIEF SUMMARY OF THE INVENTION

A composition and method for polymerization and copolymerization of cycloolefins using a feed stream including an iodide containing activator to form a substantially cross-linked polymeric product. The polymeric product may be formed by polymerization in an intricately shaped mold. High glass transition temperature and fiber reinforced products are formed.

As used herein, unless otherwise specified, percentage of materials are in percent by weight.

As used herein, unless otherwise specified, "solvent" means a fluid in which the monomer or catalyst is readily soluble.

DETAILED DESCRIPTION OF THE INVENTION

Cycloolefins, for example, dicyclopentadiene of high purity can be polymerized with or without fiber reinforcement in such a manner that the resulting product is a substantially cross-linked thermoset homopolymer or copolymer having high impact strength and high modulus.

The invention provides a method for the polymerization of cycloolefins such as dicyclopentadiene to form shaped objects containing fiber reinforcing mats of glass, graphite, or aramid. Dicyclopentadiene streams containing catalyst and activator, which allow for a long induction time before gelation or polymerization, are mixed at low pressure, and pumped slowly into a mold that contains the preplaced reinforcing mats. By filling the mold at a lower pressure and at a slower rate than is used in other liquid molding processes, such as reaction injection molding (RIM), it is much easier to completely fill through and around the preplaced reinforcing mats and prepare articles which are completely free of voids.

By the use of a dialkylaluminum iodide with an ether moderator as the catalyst activator, suitably long induction times are obtained before gelation or polymerization of the monomer, so as to allow filling large molds containing relatively high levels of preplaced reinforcing mats slowly enough to saturate (completely fill) the mats and obtain void-free articles. Gelation of the monomer is characterized by the increase in its viscosity to greater than 25,000 cps. Such a large increase in the viscosity ordinarily makes it very difficult to fill detailed molds completely without trapping pockets of air bubbles. When filling molds containing preplaced reinforcing mats, it is critical that the monomer not gel before the mold is completely filled, as it would not be possible to saturate the mat if this occurred. Gelation of the monomer would result in the mats being pushed around the mold cavity by the gelled liquids, giving uneven distribution of the reinforcement, and in the formation of sizeable voids in the molded article.

The notched Izod impact strength of polydicyclopentadiene reinforced with glass mats without elastomer is found to be from 11.9 to 14.5 ft-lbs (8.5–11 ft-lb plate impact). It is believed that this results from the ability of continuous fibers in the mat reinforcement to efficiently dissipate impact energy throughout the matrix.

The reinforcing mats used in this invention may be made of glass fiber, graphite fiber, aramid fiber, or combinations of any of the above. For example, the reinforcing mats may be nonwoven continuous strand mats of glass fiber with a density of 1.5 oz./sq.ft or 2.0 oz./sq.ft, such as OCF 8608 or OCF 8610 from Owens Corning Corp. To obtain even greater reinforcement, mats of graphite fiber or Kevlar aramid fiber may be used. Mats woven of AS-4 or AS-6 graphite fiber of density 1.0 to 1.5 oz./sq.ft from Hercules Incorporated provide excellent reinforcement.

Preferably the mat is made up of fibrous material which is woven, intertwined or interlaced. Due to such weaving, intertwining or interlacing the fibers of the mat are substantially interdependent in their response to forces applied to the mat.

Preferred cycloolefin monomers for polymerization and copolymerization by the present invention are of the norbornene-type defined by formula (I), and 1.4.5.8-dimethano-1,4,4a,5,8,8a-octahydronaphthalene (DMON) and substituted DMON of the general formula (II) as follows:

(I)

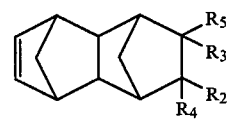
(II)

wherein R, $R_1$, $R_2$, $R_3$, $R_4$ and $R_5$ are each independently hydrogen, alkyl of from 1–10 carbon, halogen substituted alkyl, aryl, substituted aryl (where substituents are alkyl, aryl or halogen) or saturated and unsaturated hydrocarbon cyclic groups formed by R and $R_1$ or $R_2$ and $R_3$ together with the two ring carbon atoms bonded thereto. Such substituted DMON compounds are disclosed in U.S. Pat. Nos. 4,178,424, 4,418,178, 4,418,179, and 4,426,502, the disclosures of which are incorporated herein by reference.

Polymerization and copolymerization according to a preferred embodiment of the invention is carried out with an olefin metathesis catalyst system made up of a two-part activator and a catalyst which is a monomer soluble or solvent soluble tungsten compound. The two-part activator includes a trialkylaluminum compound or a dialkylaluminum chloride, as the first part of the activator, and a dialkylaluminum iodide as the second part of the activator where each alkyl group contains from one to twelve carbon atoms. Preferred dialkylaluminum chlorides are diethyl aluminum chloride and dioctylaluminum chloride. A preferred trialkylaluminum compound is trioctylaluminum. Dialkylaluminum iodide is most preferably used as a one part activator in accordance with the present invention. Preferred dialkylaluminum iodides include diethylaluminum iodide and dioctylaluminum iodide. Dioctylaluminum iodide is most preferred. In a preferred embodiment, the three parts of the olefin metathesis catalyst, plus the monomer, form the basis of at least two separate reactive streams. These can be mixed in one place, such as the mixing head of a reaction injection molding machine, and then injected into a mold where they will set up into a solid insoluble cross-linked polymer.

U.S. Pat. No 4,568,660 is incorporated herein by reference in its entirety. The disclosure of columns 6–19 of U.S. Pat. No. 4,568,660, stabilization of catalyst, induction time control additives and interpenetrating networks monomer preparation, percolation tests and mileage, calcination and regenerating, distillation and adsorption, monomer character, and catalyst preparation, are applicable to the present invention to form cycloolefin polymers and copolymers both with and without fiber reinforcement.

Analysis of the DMON/DCPD copolymer samples containing 35% DMON or greater by dynamic mechanical analysis shows that the copolymer samples undergo a minor glass transition at about 90° C. This transition is not observed in copolymers with 30% DMON or less. This is attributed to poly(DCPD) and is probably due to the samples not being truly random copolymers, but instead having some character of block copolymers, where regions, or blocks, of the polymer chain have a higher concentration of one monomer or the other than is present in the feed mixture. Separation of these regions or blocks into dispersed, microscopically observable, phases provides a continuous phase that is higher in DMON content than the feed mixture. This would account for the fact that the $T_g$'s are higher than expected. Evidence of block character begins to become apparent when 30 to 35% DMON by weight is copolymerized with DCPD. With 35% DMON, the $T_g$ of the copolymer was found to be 172° C., while a copolymer containing 30% DMON had a $T_g$ of 145° C. This large increase, or discontinuity, in $T_g$ is also taken to indicate the separation of a second phase from the bulk polymer. Preferably the copolymer of DCPD and DMON is from 30 to 80 percent by weight DMON. More preferably the copolymer of DCPD and DMON is from 35 to 70 percent by weight DMON.

Copolymers prepared in solution (as in the thermoplastic prior art) do not exhibit characteristics of block copolymers. Reactivity ratios for DCPD and DMON were calculated to be 0.838 and 2.68, respectively, for solution polymerization in toluene. Similar results are obtained for copolymerizations performed in cyclohexane or methylcyclohexane. Reactivity ratios greater than 1.0 for a monomer mean that a polymer chain terminated with that monomer is more likely to insert another molecule of the same monomer, while a reactivity ratio less than 1.0 means that a polymer chain terminated with one monomer is more likely to insert the other monomer, in an alternating fashion.

In some embodiments, a preformed elastomer is added to the reactant solution. The addition of the elastomer serves to increase the viscosity of the reactant solution and improve the impact resistance of a final thermoset polymeric product produced in accordance with the method disclosed in U.S. Pat. No. 4,400,340. Illustrative elastomers include natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, and ethylene-propylenediene terpolymers.

With poly(DCPD) some increases in notched Izod impact strength are seen upon the addition of SBR. However, there is essentially no increase seen in the plate impact strength with the addition of elastomer. Both samples with and without rubber are seen to fail in a ductile fashion in plate impact tests. Nonpolar cycloolefin copolymers of DCPD, such as DMON-DCPD copolymers show substantial increases in impact strength with the addition of small amounts of elastomer. For example, the plate impact strength for a copolymer of 40 or 50% DMON and DCPD increases from 4.3 ft-lbs to 14.7 ft-lbs at room temperature, and 14.5 ft-lbs at −40° C. This is higher than the impact strength of DCPD homopolymer. In addition the mode of failure in plate impact measurements upon addition of rubber changes from brittle to ductile failure. Tensile elongation increased from 5% to 47%. Notched Izod impact strengths of 9.1 ft lbs/in. notch were measured. These results indicate that the addition of SBR rubber to DMON:DCPD block copolymers has a significant toughening effect, as seen in both the mode of failure, and the increased impact strengths.

EXAMPLES 1–4

Examples 1–4 illustrate preferred embodiments of the synthesis of a cross-linked polymerized dicyclopentadiene via reaction injection molding where the catalyst system is activated by a mixture of trioctylaluminum (TNOA) and diethylaluminum iodide (DEAI).

In each of examples 1–4 two tanks, which have previously been closed and inerted with nitrogen, having a capacity of two gallons each, are charged with DCPD. Sufficient (WCl$_6$-WCl$_4$O in a 3:1 ratio)/nonylphenol/acetylacetone catalyst, having a ratio of 1:1:2, in xylene is added to one of the tanks to provide a DCPD:tungsten catalyst ratio of 1000:1. Next, to the other tank is added sufficient trioctylaluminum:diethylaluminum iodide:methoxyethyl ether solution, having a molar ratio of 0.85:0.15:1.0 to provide a DCPD:aluminum ratio of 1000:2.4. All transfers are done in a way to preclude the entrance of oxygen or moisture into the system. The materials are then thoroughly blended in their respective tanks.

The components of the two tanks are combined in a standard impingement type reaction injection molding (RIM) mixhead. The ratio of the activator/monomer solution mixed with the catalyst and monomer solution is 1:1. The impingement mixing is accomplished by passing both of the solutions through orifices 0.032 inch in diameter at a flow rate of approximately 80 ml/sec. This requires pumping pressure of approximately 500 psi to 1000 psi.

The resulting mixture flows directly into a mold containing a mat of either glass fibers, graphite fiber, or aramid fiber and heated to between 35° C. and 70° C. The mold is made out of chrome plated aluminum. The mold has a flat cavity which frms a plaque sample 8 inch ×8 inch ×⅜ inch thick. The reactants polymerize rapidly in the closed mold, reaction being substantially complete in about one minute or less. The mold is opened and a substantially cross-linked poly DCPD fiber reinforced product is recovered. Physical properties of the composite products are given in Table 1.

TABLE 1
Mechanical Properties of Fiber Reinforced Poly DPCD

| Example | Fiber Reinforcement | Tg (°C.) | Wt. % Fiber | % Gel | Flex Modulus (kpsi) | Flex Strength (kpsi) | Notched Izod Impact Str. (ft. lb./in.) |
|---|---|---|---|---|---|---|---|
| 1 | Glass mat | 120 | 30 | 95 | 650 | 18 | 14 |
| 2 | Glass mat | 120 | 40 | 95 | 750 | 19.8 | 15 |
| 3 | Woven graphite fiber | 120 | 30 | 95 | 1200 | 25 | 17 |
| 4 | Woven aramid fiber | 120 | 20 | 95 | 850 | 20 | 16 |

Preparation of Comonomers 1,4,5,8-Dimethano-1,4,4a,5,8,8a-hexahydronaphthalene (DMHN) is prepared as described in U.S. Pat. No. 4,568,660 in Example 35.

Tetracyclo [6.2.1.1$^{3,6}$.0$^{2,7}$] dodec-4-ene, also referred to as
1,4,5,8-Dimethano-1,4,4a,5,8,8a-octahydronaphthalene (DMON)

DMON is prepared by reacting norbornene with cyclopentadiene according to the reaction as follows:

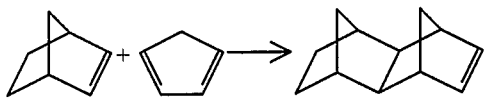

Example 5

Norbornene (76 g, 0.807 moles) is weighed into a 10 oz bottle which is then capped and sparged. DCPD (54 ml, 0.439 moles) was added by syringe. The mixture was heated to 180° C. for 16 hours, after which the bottle was cooled to room temperature and opened. Excess norbornene was removed by distillation after which the product was distilled under nitrogen in a pop bottle to give 41.7 g of DMON.

9-Methyl tetracyclo [6.2.1.1$^{3,6}$.0$^{2,7}$] dodec-4-ene (methyl DMON) is made as is known in the art.

Preparation of Copolymers of DCPD

Examples 6–11

A 0.5 M solution of tungsten catalyst is prepared by weighing 19.80 grams (0.05 moles) of WCl$_6$ under nitrogen into a 200 ml pop bottle containing a teflon-coated magnetic stirring bar. The tungsten is then slurried in 90 ml of toluene that had been distilled from Na/K alloy under nitrogen. t-Butanol (0.925 grams, 0.0125 moles) dissolved in 5 ml of toluene, is added, and the mixture is stirred for one hour while sparging with nitrogen. Nonyl phenol (11.05 grams, 0.05 moles) dissolved in 5 ml of toluene is added, and the mixture is stirred for one hour while sparging with nitrogen. Acetylacetone (10.00 grams, 0.100 moles) is then added by syringe and the mixture is stirred overnight while sparging with nitrogen to remove HCl gas. Toluene is then added to restore the volume of the solution to its original level and produce a 0.50 M solution.

A 1.0 M aluminum alkyl activator solution is prepared by diluting 3.8 grams of neat di-n-octylaluminum iodide and 1.34 grams of dibutyl ether to a volume of 10.0 ml with distilled toluene.

Copolymers of DCPD and DMON are prepared by the following procedure. Mixtures of DCPD and DMON are prepared in capped pop bottles that have been previously sparged with nitrogen. Aluminum alkyl activator (0.681 ml, 0.681 mmoles) is added to 60 ml of DMON/DCPD mixture by syringe. After mixing the solution, 0.454 ml (0.227 mmoles) of tungsten catalyst solution is added by syringe and the contents of the bottle are shaken several times. The contents of the bottle is then syringed into a flat upright mold 5"×5"×⅛" thick and the mold is placed in an oven at 60° C., to accelerate the polymerization, for 10 minutes. After that time, the mold is removed from the oven and opened and a flat hard plaque is removed. Table 2 gives values for the % insoluble gel, % swell in toluene, and T$_g$ of the copolymers.

TABLE 2
Physical Properties of DMON/DCPD Copolymers

| | Example | | | | | |
|---|---|---|---|---|---|---|
| | 6 | 7 | 8 | 9 | 10 | 11 |
| % DMON | 50 | 75 | 35 | 45 | 60 | 65 |
| % Gel | 99 | 98 | 99 | 99 | 99 | 98 |
| % Swell | 142 | 177 | 108 | 126 | 151 | 160 |
| T$_g$ | 184 | 198 | 172 | 172 | 190 | 193 |
| Flex Modulus (kpsi) | 317 | 343 | 290 | 305 | 325 | 335 |
| Flex Strength (kpsi) | 14.7 | 15.1 | 10.5 | 12 | 14.9 | 15 |
| Tensile Modulus (kpsi) | 248 | 262 | 210 | 225 | 250 | 257 |
| Tensile Strength (kpsi) | 7.7 | 7.7 | 5.8 | 7.0 | 7.6 | 7.8 |
| Tensile Elongation | 5 | 5 | 20 | 5 | 5 | 5 |
| Heat Dist. Temp. (ASTM D-648) °C. | 144 | 154 | 130 | 141 | 148 | 151 |
| Plate Impact (ft-lbs) | 4.3 | | 4.3 | | | |

Example 12

A mixture of DCPD and DMON, containing 6% by weight of Stereon 720 styrene-butadiene rubber, is added to both tanks of a reaction injection molding (RIM) machine. If desired, solid fillers such as milled glass fiber or Wollastonite can be added. Sufficient tri-n-octylaluminum is transferred into the activator tank so that the concentration was 0.0181 M. Sufficient dioctylaluminum iodide is added so that its concentration is 0.0032 M. Sufficient dimethoxyethyl ether (diglyme) is added so that the ratio of diglyme to aluminum alkyl is 1:1. Next, sufficient tungsten catalyst solution is added to the catalyst side tank to bring the concentration of catalyst to 0.0071 M. All transfers are done and all materials are handled in a way to preclude the entrance of oxygen or moisture into the system. The materials are then thoroughly blended in their respective tanks.

The mixing of the activator stream and the catalyst stream is accomplished using a standard impingement type RIM mixhead. The ratio of the activator/monomer solution mixed with the catalyst/monomer solution is 1:1. The impingement mixing is accomplished by passing both the solutions through orifices 0.032" in diameter at a flow rate approximately 80 ml/sec. This requires pumping pressures of approximately 1000 psi.

The resulting mixture flows directly into a mold heated to between 50° and 60° C. The mold has a flat cavity that forms a plaque sample 10"×10"×⅛" thick. The mold is opened and the finished plaque is removed approximately 10 to 30 seconds after the mold is filled. The physical properties and compositions of these samples are shown in Table 3.

TABLE 3

Physical Properties of DMON/DCPD Copolymers

|  | Example 12 |
| --- | --- |
| % DMON | 50 |
| % Gel | 99 |
| % Swell | 210 |
| $T_g$ | 152 |
| Flex Modulus (kpsi) | 294 |
| Flex Strength (kpsi) | 11.9 |
| Tensile Modulus (kpsi) | 228 |
| Tensile Strength (kpsi) | 5.9 |
| Tensile Elongation | 47 |
| Heat Dist. Temp. (ASTM D-648) °C. | 109 |
| Plate Impact (ft-lbs) | 14.7 |

Copolymers of DCPD and Methyl DMON

Example 13

The procedure of Examples 6-11 is followed except that methyl DMON is used as the comonomer with DCPD. A solid infusible polymer mass was obtained. The % insoluble gel, % swell in toluene and tg, as determined by dynamic mechanical analysis, for these copolymer samples are shown in Table 4.

TABLE 4

Physical Properties of Methyl DMON/DCPD Copolymers

|  | Example 13 |
| --- | --- |
| % DMON | 50 |
| % Gel | 99 |
| % Swell | 136 |
| $T_g$ | 177 |
| Flex Modulus (kpsi) | 300 |
| Flex Strength (kpsi) | 13.6 |
| Tensile Modulus (kpsi) | 242 |
| Tensile Strength (kpsi) | 7.0 |
| Tensile Elongation | 5 |
| Heat Dist. Temp. (ASTM D-648) °C. | 141 |

TABLE 4-continued

Physical Properties of Methyl DMON/DCPD Copolymers

|  | Example 13 |
| --- | --- |
| Plate Impact (ft-lbs) | 3 |

Copolymers of DCPD with DMON

Example 14

The procedure of Examples 6-11 is followed except that DMHN is used as the comonomer with DCPD in place of DMON. A solid infusible polymer mass is obtained in all cases. Table 5 gives the % insoluble gel, % swell in toluene, and Tg, as determined by dynamic mechanical analysis for these copolymer samples.

TABLE 5

| % Copolymer | % Swell | Tg |
| --- | --- | --- |
| 40 | 32 | 209 |
| 50 | 32 | 211 |
| 60 | 32 | 208 |

Gel Swell Determinations on Comonomers

A 5 g sample of copolymer is sliced into 1-2 mm thick sections across the cylindrical axis, weighed and strung onto a stainless steel wire and placed in 50 ml of toluene for each gram of copolymer. This is followed by heating to reflux for 16 hours (overnight) and cooling. Each loop is successively removed fom the flask and placed in a small crystallizing dish of fresh tolune. The slices are removed, patted dry, and weighed individually, again taking care not to not to disturb their sequence or to tear the swollen samples. After weighing, they are restrung and placed in a forced draft ($N_2$) oven at 135° C. for 16 hours (overnight). The samples are reweighed and their gel and swell values calculated.

Two samples are reacted under each set of comonomer composition. Each sample is then sliced into thin sections for gel/swell determinations.

Examples 15-19

Example 15 illustrates a method of molding poly(dicyclopentadiene) without reinforcing mats, using a Positatio PR4-5050 resin transfer machine (RTM), manufactured by Liquid Control Corp. of Canton, Ohio, to mix and dispense the monomer streams. Examples 15-19 illustrate a preferred method of molding poly(dicyclopentadiene) reinforced with glass mats.

In Table 6, the last five columns show properties of the polymer product. The first three columns show amount or proportions of additives. The tanks on the RTM machine are closed off and inerted with an atmosphere of dry nitrogen. Dicyclopentadiene monomer is charged to the two tanks. The tank on the A side is the one to which the activator solution is added; and the tank on the B side is the one to which the catalyst solution is added. If desired, rubber may be predissolved in the dicyclopentadiene monomer. Sufficient diethylaluminum iodide is added to the A tank to bring the aluminum alkyl activator concentration to 0.0414 M. Butyl ether is added to the A tank so that the ether:DEAI ratio is 1.67:1.0. Sufficient 0.50 M tungsten catalyst solution is then added to the B side to bring its concentration in the monomer to 0.0147 M. The solutions are thoroughly blended in their respective tanks. The two streams are recirculated through the delivery lines while the tanks are heated with band heaters in order to bring the streams to an equilibrium temperature of 35° C.

The monomer solutions are mixed and dispensed into a flat mold 24"×18"×⅛" thick that is heated to 60° C. In Example 15, no reinforcing mats are placed in the mold to illustrate the polymerization of the unfilled monomer and the physical properties of the resulting polymer. In Examples 16 and 17, two 1.5 oz./sq.ft mats (OCF 8608) are placed in the mold to provide a glass content of 21.5 and 24.4 wt % respectively. In Example 18, two 2.0 oz./sq.ft mats (OCF 8608) mats are placed in the mold to provide a glass content of 27.0 wt %. In Example 19, three 2.0 oz./sq.ft glass mats are placed in the mold to provide a glass content of 35.6 wt % In examples 15-19, a hard insoluble polymer is formed.

TABLE 6

| Example | Mats | Flex Modulus % SBR | Tensile Modulus % Glass | Tensile Strength (kpsi) | Plate Impact (kpsi) | Notched Izod Impact (kpsi) | (ft.-lb.) | (ft.-lb./in.) |
|---|---|---|---|---|---|---|---|---|
| 15 | none | 0 | 0 | 257 | 166 | 3.06 | 13.0 | 1.2 |
| 16 | 2 2.5 oz. | 0 | 21.5 | 605 | 255 | 8.0 | 10.3 | 11.9 |
| 17 | 2 1.5 oz. | 0 | 24.4 | 617 | 269 | 8.2 | 8.5 | — |
| 18 | 2 2.0 oz. | 0 | 27.0 | 663 | 321 | 12.8 | 8.8 | 14.5 |
| 19 | 3 2.0 oz. | 0 | 35.6 | 768 | 357 | 14.8 | 10.6 | — |

Other features, advantages and specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed is:

1. A low solvent feed composition for polymerization of cyclic olefin having less than one percent of noncycloolefin solvent on a molar basis, comprising:
    (a) at least two cyclic olefins; and
    (b) an activator mixture comprising a dialkylaluminum iodide.

2. The feed composition of claim 1 further comprising a trialkylaluminum or a dialkylaluminum chloride.

3. The composition of claim 2 wherein said dialkylaluminum iodide is diethylaluminum iodide or dioctylaluminum iodide.

4. The composition of claim 2 wherein said trialkylaluminum is trioctylaluminum said dialkylaluminum chloride is diethylaluminum chloride.

5. The compostion of claim 2 wherein further comprising a catalyst.

6. The composition of claim 5 wherein said catalyst includes a tungsten oxyhalide and a tungsten halide.

7. The composition of claim 2 further comprising elastomer.

8. The composition of claim 1 wherein at least one of said cyclic olefins is dicyclo pentadiene or 1,4,5,8 dimethano-1,4,4a,5,8,8a octahydronaphthalene (DMON)

9. The composition of claim 1 wherein one of said cyclic olefins is a compound of the general formula:

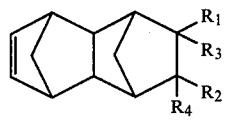

wherein $R_1$, $R_2$, $R_3$ and $R_4$ are each independently hydrogen, alkyl of from 1-10 carbon, halogen substituted alkyl, aryl, substituted aryl or saturated and unsaturated hydrocarbon cyclic groups formed by $R_1$ and $R_2$ together with the two ring carbon atoms bonded thereto wherein substituents are alkyl, aryl or halogen.

10. A method of making substantially cross-linked polymerized cyclic olefin, comprising:
    (a) providing a polymerization mixture comprising
        (i) at least two cyclic olefins,
        (ii) a catalyst,
        (iii) an activator mixture comprising dialkylaluminum iodide, and
    (b) polymerizing said polymerization mixture to form substantially cross-linked polymerized cyclic olefin.

11. The method of claim 10 further comprises a trialkylaluminum compound or a dialkylaluminum chloride.

12. The method of claim 10 wherein said polymerization mixture further comprises elastomer.

13. The method of claim 10 wherein said substantially cross-linked polymerized cyclic olefin is a thermoset polymer consisting essentially of polymerized units of dicyclopentadiene and 1,4,5,8 dimethano-1,4a,5,8,8a octahydronaphthalene and has a notched Izod impact strength of at least 1.5 ft-lb/in. notch, a flexural modulus of at least 150,000 psi and a percent gel swell determined after the polymer is immersed in toluene for two hours at 100° C. of less than about 200%.

14. The method of claim 10 wherein one of said cyclic olefins is dicyclopentadiene.

15. The method of claim 14 wherein one of said cyclic olefin comprises dicyclopentadiene and 1,4,5,8 dimethano-1,4,4a,5,8,8a octahydronaphthalene (DMON).

16. The method of claim 10 further comprising providing intertwined fiberous material in a mold and conveying said polymerization mixture into said mold.

17. A substantially cross-linked thermoset polymeric composition comprising:
    (a) substantially cross-linked polymerized units of at least two cyclic olefins, and
    (b) a dialkylaluminum iodide.

18. The composition of claim 17 further comprising a trialkylaluminum compound or a dialkylaluminum chloride and one of said cyclic olefins is dicyclopentadiene.

19. A cross-linked thermoset polymer compostion comprising polymerized units of dicyclopentadiene and 1,4,5,8 dimethano-1,4,4a,5,8,8a octahydronaphthalene.

20. The composition of claim 19 wherein said composition comprises from 35 to 70 percent by weight DMON.

21. A method of mold filling for polymerization of cyclic olefin to form cross-linked cyclic olefin comprising:
   (a) providing a polymerization mixture comprising
      (i) at least two cyclic olefins;
      (ii) activator comprising dialkylaluminum iodide; and
   (b) conveying said polymerization mixture to mold means, and allowing said mixture to polymerize to form a molded product.

22. The method of claim 21 wherein said activator further comprises a trialkylaluminum compound or a dialkylaluminum chloride.

23. The method of claim 21 wherein one of said cyclic olefins is dicyclopentadiene or 1,4,5,8 dimethano-1,4,4a,5,8,8a octahydronaphthalene (DMON).

24. The method of claim 21 wherein said polymerization mixture further comprises elastomer.

25. A substantially cross-linked thermoset polymeric composition comprising:
   (a) substantially cross-linked polymerized units of at least one cyclic olefin, and
   (b) fiberous material, and
   (c) an alkylaluminum iodide.

26. The composition of claim 25 further comprising a trialkylaluminum compound or a dialkylaluminum chloride.

27. The composition of claim 25 wherein said cyclic olefin is dicyclopentadiene DMON or a substituted DMON and said composition comprises at least two cyclic olefins.

28. The composition of claim 25 wherein said fiberous material is glass, graphite or aramid.

29. The composition of claim 25 wherein said fiberous material is woven, intertwined or interlaced.

30. A method of mold filling for polymerization of cyclic olefin to form cross-linked cyclic olefin comprising:
   (a) providing a polymerization mixture comprising
      (i) cyclic olefin;
      (ii) activator comprising an alkylaluminum iodide;
   (b) providing a mold means containing fiberous material, and
   (c) conveying said polymerization mixture to said mold means, and allowing said mixture to polymerize to form a molded product.

31. The method of claim 30 wherein said activator further comprises a trialkylaluminum compound or a dialkylaluminum chloride.

32. The method of claim 30 wherein said cyclic olefin is dicyclopentadiene or 1,4,5,8 dimethano-1,4,4a,5,8,8a octahydronaphthalene (DMON).

33. The method of claim 30 wherein said cyclic olefin comprises at least two cyclic olefins; said activator is dioctylaluminum iodide and said fibrous material is glass, graphite, or aramid.

34. A composite product, comprising an interlaced fibrous material, and cross-linked polymer, said polymer comprising polymerized units of cycloolefin, said polymer having been formed from a reactive mixture, said reactive mixture comprising cycloolefin, a tungsten containing compound as a catalyst, and an iodide containing compound as activator in contact with said fibrous material to form a composite polymeric product.

35. The product of claim 34 wherein said composite polymeric product has a flex modulus of at least 460,000 p.s.i.a., and a notched Izod impact strength of at least 8.5 foot/pounds per inch.

36. The product of claim 34 wherein said modulus is at least 600,000 p.s.i.a said fibrous material comprises glass, graphite, or aramid.

37. The product of claim 34 wherein said fiberous material comprises woven, intertwined or interlaced fibers and said fibers are substantially interdependent in their response to forces applied to the product.

38. The product of claim 34 wherein said product is formed in a mold and said fiberous material comprise glass, graphite or aramid.

39. A substantially cross-linked polymeric composition comprising:
   substantially cross-linked polymerized units of at least two cyclic olefins,
   one said cyclic olefin being dicyclopentadiene, and
   another of said cyclic olefin being a nonpolar cyclic olefin other than dicyclopentadiene,
   at least 30 percent by weight of the total weight of said two cyclic olefins being said nonpolar cyclic olefin.

40. The composition of claim 39 wherein said composition is a block copolymer and said composition has a glass transition temperature of at least 170° C.

41. The composition of claim 39 wherein said composition has a glass transition temperature of at least 190° C. and at least 35 percent by weight of the total weight of said two cyclic olefins is said nonpolar cyclic olefin.

42. The composition of claim 39 wherein said composition is a foam.

* * * * *

UNITED STATES PATENT AND TRADEMARK OFFICE
CERTIFICATE OF CORRECTION

PATENT NO. : 4,708,969
DATED : November 24, 1987
INVENTOR(S) : D. R. Leach

It is certified that error appears in the above-identified patent and that said Letters Patent is hereby corrected as shown below:

Column 5, line 10 " frms "

should read -- forms --

Column 9, Table 6, Example 16 " 22.5 oz. "

should read -- 21.5 oz. --

Signed and Sealed this

Nineteenth Day of April, 1988

Attest:

DONALD J. QUIGG

Attesting Officer

Commissioner of Patents and Trademarks